United States Patent Office 2,983,401
Patented May 9, 1961

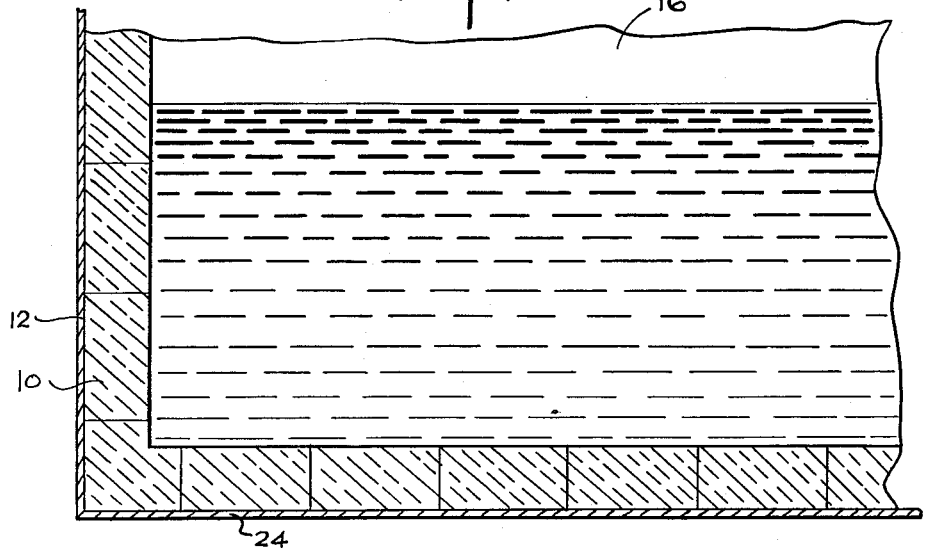
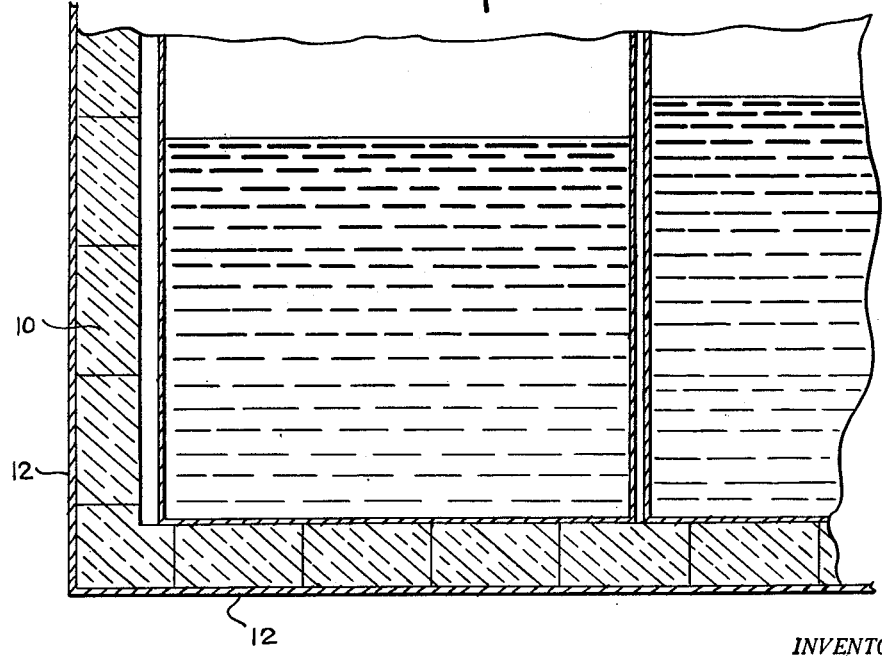

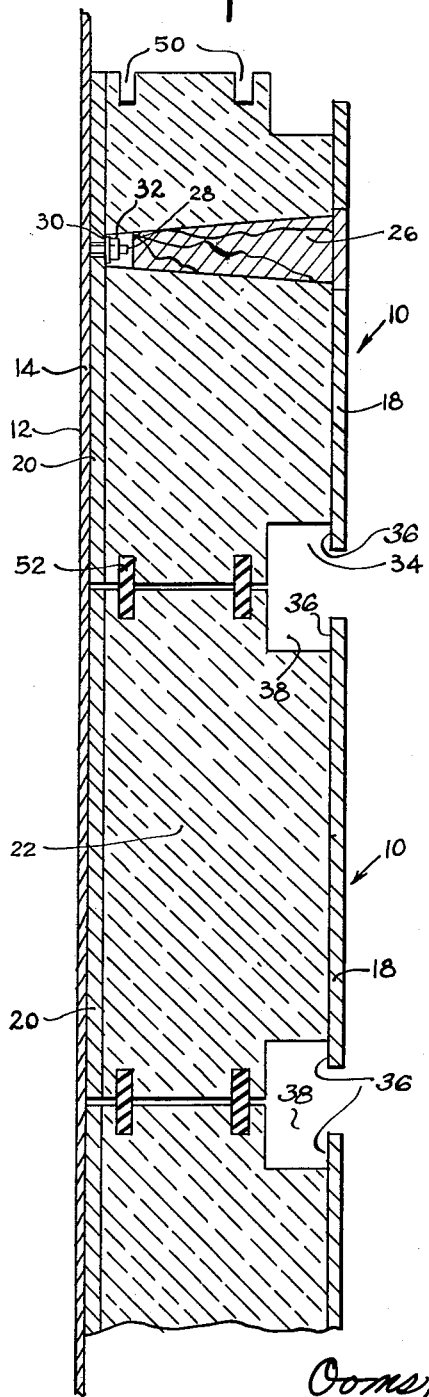
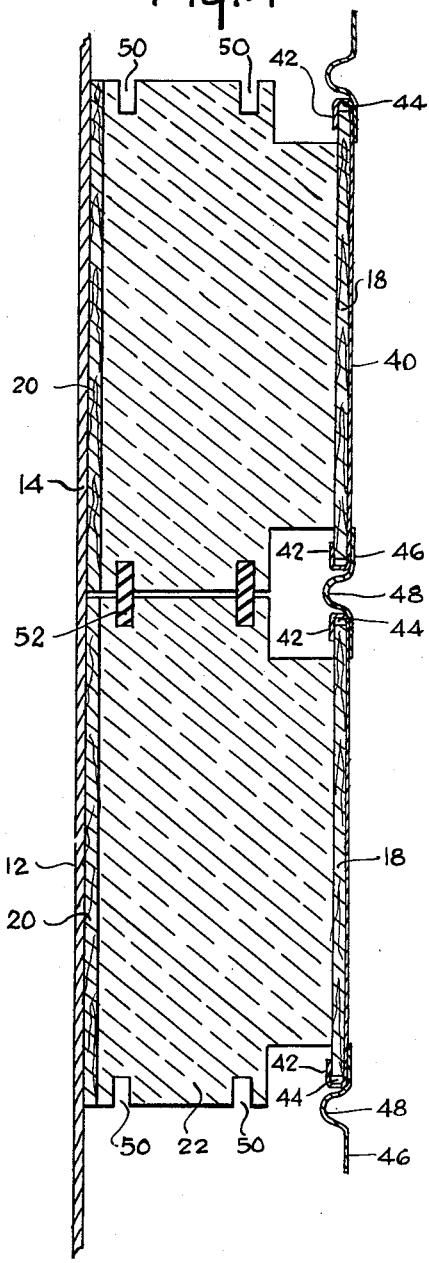

2,983,401

INSULATION SPACE AND PANELS FOR USE IN SAME

John A. Murphy, New York, N.Y., assignor, by mesne assignments, to Conch International Methane Limited, Nassau, Bahamas, a corporation of the Bahamas Filed June 25, 1958, Ser. No. 744,520

19 Claims. (Cl. 220—10)

This invention relates to the storage and transportation of a material which needs to be maintained at extremely low temperature, and it relates more particularly to an insulated space of large dimension for use in the transportation and storage of a cold liquid, such as liquefied natural gas.

Natural gas is merely representative of a material which is capable of liquefaction and which is available in excess supply in certain areas while being deficient in many others. In such instances, it is desirable to effect distribution of the gas by transportation of the gas from the area of plentiful supply to the area where a deficiency exists. Where the areas are connected by land, the gas can be made available by transmission in a gaseous state through a suitable pipeline. However, when the areas are separated by a large body of water or where the areas are substantially isolated one from the other by large stretches of land, pipeline transmission becomes impractical.

Considerable effort has been expended in the search for suitable means for the transmission of the gas other than by pipeline. It is known that the gas could be housed in suitable tanks for transportation from the source of plentiful supply to the area where a deficiency exists, but the volume of gas capable of being transmitted by such means is so limited as to render the system impracticable. It is known that a gas is reduced in volume in the ratio of $\frac{1}{600}$ when converted from a gaseous state to a liquefied state at equivalent pressure. Thus, more efficient utilization can be made of the space available when the gas is transported in a liquefied state, such that it becomes practical to liquefy the gas at the source of plentiful supply for transportation in a liquefied state to areas where a deficiency exists, where the liquefied gas can be reconverted to the gaseous state for use.

For practical operation, it is desirable to provide for storage and transportation of the liquefied gas in large volume and in tanks of large capacity. This limits the operation to storage and transportation in structures maintained at about atmospheric pressure or preferably slightly above. Methane, which represents the principal component of natural gas, has a bubble point or critical vaporization point at about $-258°$ F. at atmospheric pressure. Thus liquefied natural gas, which is representative of one of the gases capable of liquefaction and transportation in accordance with the practice of this invention, will have to be maintained at a temperature below about $-240°$ F., depending upon the amount of heavier hydrocarbons in the gas.

Maintenance of the liquefied gas at such extremely low temperature presents a number of problems from the standpoint of the materials employed and the insulation to prevent heat gain which otherwise would cause excessive vaporization of the liquefied gas.

In a system described in the copending Dosker application, Serial No. 646,001, filed March 14, 1957, description is made of a means for the transportation and storage of a liquefied gas wherein a large insulated space is provided and in which one or more aluminum tanks of large capacity are positioned for housing the cold liquid. The space is insulated by large pre-formed panels of a pre-formed modular construction mounted on the supporting walls and floor to provide an insulation lining about the storage space.

The tanks are preferably formed to a rectangular or other polygonal shape in cross-section to permit more efficient utilization of the insulated space, but the tanks could be round or of other shapes, if desired. The metal of which the tanks are formed is limited by the low temperature to which it will be subjected in use, as represented by aluminum, alloys of aluminum, copper, stainless steels or other austenitic steels, or other metals which do not lose their ductility and strength at low temperature.

In a construction of the type described, it is essential to make use of tanks which are capable of self-sufficiency under the temperature and load conditions existing. The problem is aggravated when use is made of rectangularly shaped tanks which are incapable of the distribution of forces characteristic of cylindrical tanks, and when storage and transporation is achieved by way of a ship which is subject to varied movements on water. Thus, tanks capable of use under the described conditions represent units of considerable cost.

It will be desirable to be able to eliminate the tanks and to rely on other less expensive means for housing the cold liquid in the insulated storage space, and it is an object of this invention to provide a means and method for accomplishing same.

More specifically, it is an object of this invention to produce and to provide a method for producing an insulated housing of large capacity for the storage and/or transporation of a cold liquid, and it is a related object to make use of an insulated space in which the insulation layer provides support for a lining of a fluid-impervious material defining the housing for the cold liquid; in which the insulation layer provides the insulation to prevent excessive heat gains, and which includes means for compensating for the relative movements normally taking place between the elements in expansion and contraction responsive to temperature change.

These and other objects and advantages of this invention will hereinafter appear and for purposes of illustration, but not of limitation, an embodiment of the invention is shown in the accompanying drawings, in which—

Figure 1 is a schematic elevational view in section of a porton of the insulated space embodying the features of this invention;

Figure 2 is a view similar to that of Figure 1 embodying a modification wherein the insulated space can be employed as a secondary housing in combination with storage tanks positioned therein;

Figure 3 is an enlarged sectional elevational view of the modular panels of insulation mounted in position of use upon the supporting wall; and Figure 4 is a view similar to that of Figure 3 showing the completed insulation lining embodying the features of this invention.

Referring now to the drawings for a description of the invention, use is made of a plurality of large modular panels 10 of insulation material which are mounted in end-to-end and in side-by-side relation on a supporting wall 12 to provide a substantially continuous lining of insulation material defining the storage space 16. The panels may be of the type described in the aforementioned Dosker application comprising inner and outer faces 18 and 20 of plywood sheets formed of hardwood, with a relatively thick section 22 inbetween formed of a low density, structurally strong, and dimensionally stable insulation material, as represented by balsa wood, quippo wood, or a honeycomb construction formed of paper or corrugated veneer.

Assembly of the panels on the floor 24 or side walls 12, which may be formed of steel or other supporting members, may be made by various means to mount the modular panels 10 in side-by-side and in end-to-end relation substantially completely to cover the floor and walls with a continuous layer of insulation material. The mounting relation can be effected as described in the aforementioned Dosker application, wherein spaced openings 26 are provided in each of the panels for the insertion of a Nelson stud 28 which is welded to an aligned portion of the supporting wall 14, with a portion of the stud extending inwardly through the opening. A washer or gasket 30 of metallic or a resilient material may be inserted onto the stud and brought into pressing engagement with the inner face of the outer panel 20 by means of a lock nut 32 or the like. It will be understood that the invention is not limited to the specific construction of the panel or its mounting as long as the panel is of a modular construction which is firmly supported on the wall and is in itself capable of dimensional stability and mass integrity.

In accordance with the practice of this invention, the panels 10 are constructed with a recess 34 about the perimetric edges adjacent the inner face, and with the inner plywood panel 18 extending a short distance outwardly beyond the recess to provide an overhang 36, but for a distance less than the width of the recess so that adjacent panels will substantially abut one another about their perimetric edges adjacent the outer portions but will provide a continuous, contiguous opening 38 between the perimetric edges adjacent the inner portion.

A continuous sheet 40 of a metal which retains its ductility at the low temperature of the liquid, as represented by aluminum, alloy of aluminum, copper, stainless steel or the like austenitic steel, and dimensioned to be slightly greater in length and width than the corresponding dimensions of the inner plywood panel 18, is positioned adjacent the inner face of the panel. The end portions 42 of the metal face sheet which extend beyond the edges of the panel 18 are turned about the overhang to cause the metal face sheet to cling onto the surface of the panels without providing a bonding relationship therebetween. Thus each of the metal face sheets is independently held onto the insulation panel to constitute the inner surface thereof while permitting free relative movements between the panel and the metal face sheet as affected by their differences in coefficient of expansion and contraction due to temperature changes which will take place in use.

For this purpose, it is desirable to turn back the edges 42 of the metal sheet against the under side of the overhang 36, but with the allowance of sufficient space 44 between the edges of the face ply 18 and the ends of the confining metal sheet 40 to correspond to the differential in contraction calculated to take place when the corresponding elements are reduced in temperature from the ambient temperature of installation to the temperature of the cold liquid, which may be of the order of —250° F. with liquefied natural gas. The overlapping relation between the inturned edge portions of the metal sheet and the corresponding overhang should be sufficient to avoid clearance therebetween in response to relative movements between the metal sheet and panel so that the sheet will be permanently held in the assembled relation on the panel. When the elements are centered, the overlap should be greater than the spaced relation 44 available in the opposite edge. The metal sheet is applied to the face of each of the panels after installation, but it can be preassembled onto the panels prior to installation if means other than that requiring access from the inner side are employed for mounting the modular panels on the supporting walls.

Since the panels will be installed at about ambient temperature, and since the inner portions of the panels will be reduced in temperature to about —250° F. in use, a considerable amount of relative movement will take place between the adjacent panels to vary the spaced relation therebetween. To compensate for the relative movement between the panels both in expansion and in contraction responsive to temperature change without disturbing the continuity of the supported metal lining, joining strips 46 in the form of expansion members are provided with a bulbous or corrugated portion 48 extending linearly continuously through the central portion thereof. The expansion strips which are formed of a metal similar to that forming the facing sheets 40, are dimensioned to extend beyond the opening formed between the inner surfaces of adjacent panels so as to lap the adjacent metal facing sheets for attachment thereto in sealing relation, as by suitable metal joining means such as brazing, welding, soldering or the like. The bulbous portion 48 is dimensioned to be received within the opening 34 and in the slotted portion between the adjacent panels, but the expansion strip may, if desired, be positioned with the bulbous portion extending inwardly into the insulated space.

Thus, as the panels move in a direction away from each other in response to contraction, the bulbous portion 48 is reduced to enable the strip to expand laterally by an amount to correspond to the increased spaced relation formed between the panels. Conversely, expansion of the panels in response to increase in temperature will be compensated by an increase in the dimension of the bulbous portion by an amount to take up the additional metal provided by the lesser effective width of the strip. As previously pointed out, instead of positioning the bulbous portion to extend outwardly into the opening between the adjacent panels, the bulbous portion of the expansion strip can be positioned to extend inwardly into the storage space, and use can be made of a series of bulbous portions or corrugations for greater flexibility.

In the modification illustrated in Figure 3, means are provided to maintain an interconnection between the panels to block spaces developing between adjacent panels. Thus convection currents are avoided which might otherwise reduce the effectiveness of the insulation. For this purpose, continuous grooves 50 are provided in the perimetric surfaces of the panels adjacent their outer edges. The contiguous space formed by the aligned grooves of adjacent panels is adapted to be filled with a continuous strip 52 of a resilient material, such as foamed rubber or elastomer, plastics or the like.

Each of the metal sheets 40 on each of the mounted panels is secured in sealing relation one with the other to provide a continuous fluid and vapor-impervious surface supported throughout by the insulation panels to eliminate the need for internal supports and to provide a backing for each of the metallic sheets for support thereof under load when the tank is filled with the cold liquid. Thus the continuous metal lining formed on the insulation is capable of functioning as a primary container for housing the cold liquid, thereby to avoid the expense and the problems characteristic of the use of separate tanks for housing the liquid. It will be understood, however, that the described panel construction with a continuous supported film or sheet of metal lining which is free to move relative to its support, can be employed as a secondary container in which separate tanks can be installed for housing the liquid. In such instance, the sheet metal lining will function as a second barrier to the penetration of liquid escaping from the tanks or otherwise coming in contact therewith.

It will be apparent that, instead of providing a continuous overhang, the assembled relation between the metal facing sheet and the underlying panel can be effected by segments of metal extending outwardly from the sheet and downturned to clamp the panel therebetween in a manner to permit limited relative movement or by the use of other clamps.

It will be apparent further that while the invention is described with reference to the build-up of an insulated space for a cold cargo, the insulated space is of a character for use with a hot cargo as well.

It will be apparent from the foregoing that I have provided a construction for the build-up of an insulated space wherein the walls of the insulation are lined with a continuous metallic member formed in sections, each of which is individually supported and backed by separately mounted modular panels of insulation but which are substantially independent from the supporting panels from the standpoint of relative movements, thereby to eliminate stresses otherwise developed when the metallic sheets are interbonded with the backing or support formed of a material which differs from the standpoint of the coefficients of expansion or contraction. It will be apparent further that the construction described permits rapid and economical construction of an insulated space of large dimension which can be used as the primary storage for a liquid or which can be used as a secondary housing for the installation of separate tanks in which the liquid is contained.

The concepts of this invention can also be practiced with the use of sheets formed of vapor and fluid impervious materials other than metal. For example, a panel or sheet of polyethylene embodying the dimensional characteristics of the metal sheet 40 can be substituted for the metal sheets both in the facing of the panel and in the expansion strip 48 for joinder one with the other in sealing relationship as by a fusion technique or the like. Polyethylene sheets of sufficient rigidity and thickness can be folded at their edges to cling to the underlying insulation panel and the sheets will be fluid and vapor impervious as well as resistant to the liquid and insoluble therein. Other similar types of vapor and fluid impervious synthetic resinous or elastomeric sheets capable of retaining flexure strength and ductility at the low temperature of the liquid can be used, with or without glass or other fiber reinforcement.

It will be understood that changes may be made in the details of construction, arrangement and operation without departing from the spirit of the invention, especially as defined in the following claims.

I claim:

1. In an insulated space of large dimension for the storage of a material which needs to be maintained at a temperature differing considerably from the ambient temperature, supporting walls defining the space to be insulated, a plurality of prefabricated modular insulation panels having inner and outer face sheets with a thick layer of insulation therebetween, means mounting the panels on the supporting wall in end-to-end and in side-by-side relation substantially completely to cover the wall, a metal face sheet dimensioned to extend continuously across the inner face of each panel, means mounting the individual metal face sheets as an inner facing on individual panels but in slidable relationship therewith to permit relative movements between the panels in expansion and contraction, and means joining in sealing relation the linear edge portions of the metal facing sheets of adjacent panels with a bulbous portion in between to permit relative movements between adjacent panels in expansion and contraction without disturbing the sealing relationship therebetween.

2. An insulated space as claimed in claim 1 in which the prefabricated insulation panels are formed with the inner face sheet of smaller dimension than the panel but larger than the immediate adjacent portion of the underlying insulation layer to provide an overhang all around and in which the means for mounting the individual metal face sheets as a facing on the individual panels comprises a metal face sheet being dimensioned to be larger in width and length than the corresponding dimensions of the inner face sheet, said portions of the metal extending beyond the panel being downturned to receive the overhang therebetween.

3. An insulated space as claimed in claim 1 in which the prefabricated modular panels are of rectangular shape.

4. An insulated space as claimed in claim 1 in which the means joining the adjacent panels in sealing relation comprises a metal expansion strip having a bulbous portion extending continuously through the central portion thereof, the edges of said strip being secured in sealing relation to the linear edge portions of the metal facing sheets of adjacent panels with the bulbous portion in alignment between the meeting edges of the adjacent panels.

5. An insulated space as claimed in claim 4 in which an opening is provided in the panel sections between the meeting edges in which the bulbous portion is received in free relation.

6. An insulation panel of large dimension for assembly in end-to-end relation and in side-by-side relation on a supporting wall to form a substantially continuous insulation lining comprising a panel section having a relatively thick intermedaite section of insulation material, an outer, relatively rigid panel of high strength fixed to the outer face of the insulation section, an inner relatively rigid panel of high strength fixed to the inner face of the insulation section in spaced parallel relationship with the outer panel and with the insulation material in between, said inner panel being dimensioned to be slightly less in length and width than the corresponding dimension of the outer panel, said insulation section having a recessed portion about the inner edge immediately underlying the inner panel thereby to provide a recessed portion about the inner edge underlying the inner panel, and means for securing the panel onto the supporting wall.

7. An insulation panel of large dimension for assembly in end-to-end relation and in side-by-side relation on a supporting wall to form a substantially continuous insulation lining comprising a panel section having a relatively thick intermediate section of insulation material, an outer relatively rigid panel of high strength fixed to the outer face of the insulation section, an inner relatively rigid panel of high strength fixed to the inner face of the insulation section in spaced parallel relation with the outer panel substantially throughout its length with the insulation material in between and with the outer edge portions of the inner panel extending a short distance beyond the underlying portions of the insulation section to provide an overhang, a continuous sheet of metal adjacent the inner facing of the inner panel in slidable relationship therewith and dimensioned to have a length and width greater than the corresponding dimensions of the underlying inner panel, means for holding the metal sheet to the inner panel in a manner to permit free relative movements therebetween, and means for securing the panel to the supporting wall.

8. An insulation panel as claimed in claim 7 in which the metal sheet has portions extending beyond the inner panel and formed to channel shape and dimensioned to receive the edge portions of the inner panel therein.

9. An insulation panel as claimed in claim 7 in which the edge portions of the metal facing sheet beyond the panel are reversely bent to embrace the edge portion of the panel to provide the means for holding the metal sheet to the panel.

10. An insulation panel as claimed in claim 9 in which the effective length and width of the metal face sheet between the downturned portions are greater than the corresponding dimensions of the underlying panel by an amount at least as great as the differential in expansion and contraction in response to a temperature change of about $-358°$ F.

11. An insulation panel as claimed in claim 7 in which the metal face sheet is formed of a metal capable of retaining its ductility at low temperature.

12. An insulation panel as claimed in claim 7 in which the metal is selected from the group consisting of aluminum, alloy of aluminum, copper, stainless steel, and an austenitic steel.

13. In an insulated space of large dimension for the storage of a material which needs to be maintained at a temperature differing considerably from the ambient temperature, supporting walls defining the space to be insulated, a plurality of prefabricated modular insulation panels having inner and outer face sheets with a thick layer of insulation therebetween, means mounting the panels on the supporting wall in end-to-end and in side-by-side relation substantially completely to cover the wall, a metal face sheet dimensioned to extend continuously across the face of each panel, means mounting the individual face sheets as an inner facing on the individual panels but in slidable relationship therewith to permit relative movements between the metal face sheets and the underlying panels in expansion and contraction, and means joining in sealing relationship the linear edge portions of the metal facing sheets of adjacent panels to provide a substantially continuous liquid impervious lining.

14. An insulated space as claimed in claim 13 which includes expansion means incorporated in the lining of joined metal face sheets.

15. In an insulated space of large dimension for the storage of a material which needs to be maintained at a temperature differing considerably from the ambient temperature, supporting walls defining the space to be insulated, a plurality of prefabricated modular insulation panels having inner and outer face elements with a thick layer of insulation therebetween, means mounting the panels on the supporting wall in end-to-end and in side-by-side relation substantially completely to cover the wall, a facing sheet of a fluid and vapor impervious material dimensioned to extend continuously across the inner face of each panel, means mounting the individual face sheets as an inner facing on the individual panels but in slidable relationship therewith to permit relative movements between the face sheets and the underlying panels in expansion and contraction, and means joining in sealing relationship the linear edge portions of the facing sheets of adjacent panels to provide a substantially liquid impervious lining.

16. An insulated space as claimed in claim 15 in which the facing sheet is a film of a fluid and vapor impervious synthetic, organic, polymeric film-forming material.

17. An insulated space as claimed in claim 15 which includes expansion means incorporated in the lining of joined facing sheets.

18. In an insulation panel of large dimension for assembly in end-to-end relation and in side-by-side relation on a supporting wall to form a substantially continuous insulation lining comprising a panel section having a relatively thick intermediate section of insulation material, an outer relatively rigid panel of high strength fixed to the outer face of the insulation section, an inner relatively rigid panel of high strength fixed to the inner face of the insulation section in spaced parallel relation with the outer panel and with the outer edge portions of the inner panel extending a short distance beyond the underlying portions of the insulation section to provide an overhang, a continuous sheet of a fluid and vapor impervious material positioned adjacent the inner face of the inner panel but in slidable relationship therewith and dimensioned to have a length and width greater than the corresponding dimensions of the underlying inner panel, means for holding the fluid and vapor impervious sheet to the inner panel in a manner to permit free relative movements therebetween, and means for securing the panel onto the supporting wall.

19. An insulation panel as claimed in claim 18 in which the fluid and vapor impervious sheet comprises a film of a fluid and vapor impervious synthetic, organic, polymeric film-forming material.

References Cited in the file of this patent

UNITED STATES PATENTS

| | | |
|---|---|---|
| 1,230,586 | Lister | June 19, 1917 |
| 1,357,713 | Lane | Nov. 2, 1920 |
| 1,615,801 | Elmendorf | Jan. 25, 1927 |
| 1,694,947 | Lindsay | Dec. 11, 1928 |
| 1,799,234 | Huff | Apr. 7, 1931 |
| 1,888,039 | Huff | Nov. 15, 1932 |
| 2,020,630 | Anderson | Nov. 12, 1935 |
| 2,028,968 | Carlstrom | Jan. 28, 1936 |
| 2,154,143 | Whelan | Apr. 11, 1939 |
| 2,172,048 | Johnson et al. | Sept. 5, 1939 |
| 2,238,022 | Johnson | Apr. 8, 1941 |
| 2,479,342 | Gibbons et al. | Aug. 16, 1949 |
| 2,537,466 | Kiefer | Jan. 9, 1951 |
| 2,576,698 | Russum | Nov. 27, 1951 |
| 2,705,414 | Rose | Apr. 5, 1955 |
| 2,833,004 | Johnson et al. | May 6, 1958 |

FOREIGN PATENTS

| | | |
|---|---|---|
| 387,450 | Great Britain | Feb. 9, 1933 |
| 730,699 | Great Britain | May 25, 1955 |